(12) United States Patent
Liu et al.

(10) Patent No.: US 9,933,649 B1
(45) Date of Patent: Apr. 3, 2018

(54) DISPLAY PANEL HAVING A NON-RECTANGULAR DISPLAY REGION AND A PERIPHERAL REGION

(71) Applicants: HannStar Display(Nanjing) Corp., Nanjing (CN); HannStar Display Corporation, Taipei (TW)

(72) Inventors: Hsuan-Chen Liu, Kaohsiung (TW); Chien-Ting Chan, Tainan (TW)

(73) Assignees: HannStar Display(Nanjing) Corp., Nanjing (CN); HannStar Display Corporation, Taipei (TW)

( * ) Notice: Subject to any disclaimer, the term of this patent is extended or adjusted under 35 U.S.C. 154(b) by 0 days.

(21) Appl. No.: 15/358,149

(22) Filed: Nov. 22, 2016

(30) Foreign Application Priority Data

Sep. 23, 2016 (CN) .......................... 2016 1 0846173

(51) Int. Cl.
| | |
|---|---|
| *H01L 27/14* | (2006.01) |
| *H01L 29/04* | (2006.01) |
| *H01L 29/15* | (2006.01) |
| *H01L 31/036* | (2006.01) |
| *G02F 1/1335* | (2006.01) |
| *G02F 1/1362* | (2006.01) |
| *G02F 1/1368* | (2006.01) |

(52) U.S. Cl.
CPC ...... *G02F 1/133512* (2013.01); *G02F 1/1368* (2013.01); *G02F 1/136286* (2013.01); *G02F 1/136227* (2013.01); *G02F 2201/18* (2013.01); *G02F 2201/40* (2013.01)

(58) Field of Classification Search
CPC ............... H01L 27/3248; H01L 27/326; H01L 27/14603; H01L 27/14605; H01L 27/14812; G02F 1/133512; G02F 1/136286; G02F 2201/18; G02F 2201/40; G02F 1/136227
See application file for complete search history.

(56) References Cited

U.S. PATENT DOCUMENTS

| | | | |
|---|---|---|---|
| 8,674,904 B2 | 3/2014 | Taguchi et al. | |
| 2014/0285478 A1* | 9/2014 | Ono ..................... | G09G 3/3614 345/209 |
| 2015/0116625 A1* | 4/2015 | Hwang ............. | G02F 1/136209 349/57 |
| 2016/0133173 A1* | 5/2016 | Tsai .................. | G02F 1/136286 345/694 |
| 2016/0377915 A1* | 12/2016 | Kim .................. | G02F 1/133512 349/42 |

\* cited by examiner

*Primary Examiner* — Thanh Y Tran
(74) *Attorney, Agent, or Firm* — JCIPRNET

(57) ABSTRACT

A display panel including a first substrate, a plurality of pixel units disposed on the first substrate and a shielding layer is provided. Each pixel unit includes a thin-film transistor, a first signal line and a second signal line electrically connected to the thin-film transistor. The shielding layer includes a first portion located on a peripheral region and a second portion located on a non-rectangular display region. An inner contour of an orthogonal projection of the first portion of the shielding layer on the first substrate includes a plurality of first line segments and a plurality of second line segments. The first line segments are parallel to orthogonal projections of the first signal lines on the first substrate. The second line segments are respectively parallel to orthogonal projections of the second signal lines on the first substrate.

20 Claims, 9 Drawing Sheets

DISPLAY PANEL HAVING A NON-RECTANGULAR DISPLAY REGION AND A PERIPHERAL REGION

CROSS-REFERENCE TO RELATED APPLICATION

This application claims the priority benefit of China patent application serial no. 201610846173.4, filed on Sep. 23, 2016. The entirety of the above-mentioned patent application is hereby incorporated by reference herein and made a part of the specification.

BACKGROUND OF THE INVENTION

Field of the Invention

The invention relates to a photoelectric device, and particularly related to a display panel.

Description of Related Art

Display panel is generally applied in electronic products (for example, mobile phones, computers, etc.), and a display region of the display panel generally presents a rectangular shape. In recent years, with the development of application of the display panel, the rectangular display region of the display panel cannot satisfy various application demands. For example, when the display panel is applied to a wearable application (for example, a watch, etc.), the rectangular display region may limit an appearance of a wearable display device, and the display region of the display panel is probably required to be a non-rectangular shape, for example, a circular shape, etc. When the display panel is applied to a vehicle dashboard, the display region of the display panel is probably required to be the non-rectangular shape, for example, a semicircle, a bow shape, etc. Referring to FIG. 1a and FIG. 1b, FIG. 1a is a top view of a conventional display panel having a circular display region, and FIG. 1b is a part R of the display panel of FIG. 1a. The display panel 200 has a display region 200a and a peripheral region 200b. The display region 200a has a circular shape, and a shielding layer 250 is located on the peripheral region 200b, and a contour of the shielding layer 250 is overlapped with an edge of the round display region 200a. As shown in FIG. 1a and FIG. 1b, since the contour of the shielding layer 250 is overlapped with the edge of the round display region 200a, the contour of the shielding layer 250 has a circular arc shape, such that a part of areas of pixel units 240-R1, 240-G1 and 240-B1 located at an edge of a pixel row is shielded by the shielding layer 250, which results in a fact that aperture ratios of the pixel units 240-R1, 240-G1 and 240-B1 located at the edge of the pixel row are greatly decreased compared with that of other pixel units 240-R2, 240-G2 and 240-B2. Each pixel is composed of three pixel units. A color and a brightness of the pixel composed of the pixel units 240-R1, 240-G1 and 240-B1 is different with that of the pixels (for example, the pixel composed of the pixel units 240-R2, 240-G2 and 240-B2) that are not shielded by the shielding layer 250, which causes a problem of color unbalance or brightness unevenness at the edge of the circular display region 200a. Moreover, since the shielding layer 250 is generally formed by first depositing a shielding material and then performing exposure and development processes, and the contour of the shielding layer 250 is the circular arc shape, manufacturing difficulty is increased, and the exposure and development processes used for forming the shielding layer 250 are required to be strictly controlled to meet a specification of the size of the shielding layer 250, so as to avoid light leakage caused by the fact that the shielding layer 250 cannot completely shield the peripheral region 200b. Moreover, regarding the non-rectangular display regions with different shapes, a designer has to redesign the shielding layer and/or the pixel units in allusion to the shape and the characteristic of each of the non-rectangular display regions, which causes delay and inconvenience of product developments.

SUMMARY OF THE INVENTION

The invention is directed to a display panel, which is easy to realize a free-form non-rectangular display region.

The invention provides a display panel including a first substrate, a plurality of pixel units disposed on the first substrate and a shielding layer. Each of the pixel units includes a thin-film transistor, a first signal line and a second signal line electrically connected to the thin-film transistor. The shielding layer includes a first portion located on a peripheral region and a second portion located on a non-rectangular display region. An inner contour of an orthogonal projection of the first portion of the shielding layer on the first substrate includes a plurality of first line segments and a plurality of second line segments. The first line segments are respectively parallel to orthogonal projections of the first signal lines on the first substrate. The second line segments are respectively parallel to orthogonal projections of the second signal lines on the first substrate.

The invention provides a display panel including a first substrate, a plurality of pixel units and a shielding layer. The display panel has a non-rectangular display region and a peripheral region outside the non-rectangular display region. The pixel units disposed on the first substrate and located on the non-rectangular display region. Each of the pixel units includes a thin-film transistor, a first signal line and a second signal line electrically connected to the thin-film transistor. An extending direction of the first signal line is different with an extending direction of the second signal line. The shielding layer is located on the peripheral region. The inner contour of an orthogonal projection of the shielding layer on the first substrate includes a plurality of first line segments and a plurality of second line segments. The first line segments are respectively parallel to orthogonal projections of the corresponding first signal lines on the first substrate. The second line segments are respectively parallel to orthogonal projections of the corresponding second signal lines on the first substrate.

The invention provides a display panel including a first substrate, a plurality of pixel units and a shielding layer. The display panel has a non-rectangular display region and a peripheral region outside the non-rectangular display region. The pixel units disposed on the first substrate and located on the non-rectangular display region. Each of the pixel units includes a thin-film transistor, a first signal line and a second signal line electrically connected to the thin-film transistor. An extending direction of the first signal line is different with an extending direction of the second signal line. A part of a contour of an orthogonal projection of the shielding layer on the first substrate extends along outer edges of the pixel units located at the edge of the non-rectangular display region, and includes a plurality of first line segments and a plurality of second line segments. The first line segments are respectively parallel to orthogonal projections of the corresponding first signal lines on the first substrate, and the second line segments are respectively parallel to orthogonal projections of the corresponding second signal lines on the first substrate.

In an embodiment of the invention, the display panel further includes a second substrate. The second substrate is opposite to the first substrate. The shielding layer is disposed on the second substrate.

In an embodiment of the invention, one of the first signal line and the second signal line is a gate line, and the other one of the first signal line and the second signal line is a data line.

In an embodiment of the invention, an included angle between an orthogonal projection of the first signal line on the first substrate and an orthogonal projection of the second signal line on the first substrate is θ, and θ=90°.

In an embodiment of the invention, an included angle between an orthogonal projection of the first signal line on the first substrate and an orthogonal projection of the second signal line on the first substrate is θ, and 75°≤θ≤105°, θ≠90°.

In an embodiment of the invention, the aforementioned θ=83° or 97°.

In an embodiment of the invention, the pixel units are arranged into a plurality of pixel rows and a plurality of pixel columns, and an included angle between two orthogonal projections of the first signal line and the second signal line of one pixel unit on the first substrate is (90°−α), and an included angle between two orthogonal projections of a first signal line and a second signal line of another pixel unit on the first substrate is (90°+α), the another pixel unit adjacent to the pixel unit is located in a same pixel column with the pixel unit, and 0°<α≤15°.

In an embodiment of the invention, the aforementioned α=7°.

In an embodiment of the invention, two of the second line segments are respectively parallel to orthogonal projections of two second signal lines of two pixel units on the first substrate, and the two pixel units are located in a same pixel column and located adjacent to each other.

In an embodiment of the invention, the second signal line of each of the pixel units includes a first portion and a second portion extending towards different directions. An included angle between an orthogonal projection of the first portion of the second signal line on the first substrate and an orthogonal projection of the second portion of the second signal line on the first substrate is (180°−2β) or (180°+2β), and 0°<β≤15°.

In an embodiment of the invention, the aforementioned β=7°.

In an embodiment of the invention, the pixel units are arranged into a plurality of pixel rows and a plurality of pixel columns, an included angle of one pixel unit is (180°−2β), an include angle of another pixel unit that located in a same pixel column with the pixel unit and located adjacent to the pixel unit is (180°+2β).

In an embodiment of the invention, one of the second line segments is parallel to orthogonal projections of the first portion of the second signal line and the second portion of the second signal line on the first substrate.

In an embodiment of the invention, the first portion of the second signal line is connected to the second portion of the second signal line to form the V-shape second signal line.

In an embodiment of the invention, the pixel units are arranged into a plurality of pixel rows and a plurality of pixel columns, an area of each of the pixel units of each pixel row is the same, and an area of each of the pixel units of each pixel column is the same.

In an embodiment of the invention, each of the pixel units further includes a pixel electrode electrically connected to the thin-film transistor and a common electrode overlapped to the pixel electrode. One of the pixel electrode and the common electrode has a plurality of slits, and the slits expose the other one of the pixel electrode and the common electrode.

In an embodiment of the invention, the second portion of the shielding layer has a plurality of openings respectively corresponding to the plurality of pixel units.

In an embodiment of the invention, the second portion of the shielding layer covers at least one of the first signal line, the second signal line and the thin-film transistor of each of the pixel units.

In an embodiment of the invention, an edge of one of the openings is parallel to orthogonal projections of the first signal line and the second signal line of the corresponding pixel unit on the first substrate.

In an embodiment, one of the openings has a first opening edge, a second opening edge, a third opening edge and a fourth opening edge. The first opening edge and the second opening edge are disposed opposite to each other. The third opening edge and the fourth opening edge are disposed opposite to each other. The third opening edge is connected between the first opening edge and the second opening edge. The fourth opening edge is connected between the first opening edge and the second opening edge. At least one of the third opening edge and the fourth opening edge includes a first portion and a second portion. An extending direction of the first portion of the at least one of the third opening edge and the fourth opening edge and an extending direction of the second portion of the at least one of the third opening edge and the fourth opening edge are different with each other. An orthogonal projection of the first portion of the at least one of the third opening edge and the fourth opening edge on the first substrate is parallel to an orthogonal projection of a corresponding first signal line on the first substrate.

In an embodiment of the invention, the third opening edge and the fourth opening edge respectively include two first portions and two second portions. A distance between a second portion of the third opening edge and a second portion of the fourth opening edge is greater than a distance between a first portion of the third opening edge and a first portion of the fourth opening edge. The distance between the second portion of the third opening edge and the second portion of the fourth opening edge and the distance between the first portion of the third opening edge and the first portion of the fourth opening edge are calculated along a direction parallel to the extending direction of the second signal line.

In an embodiment of the invention, one of the openings includes a first opening edge, a second opening edge, a third opening edge and a fourth opening edge, the first opening edge is opposite to the second opening edge, the third opening edge is opposite to the fourth opening edge, the third opening edge is connected between the first opening edge and the second opening edge, the fourth opening edge is connected between the first opening edge and the second opening edge, at least one of the first opening edge and the second opening edge comprises a first portion and a second portion, an extending direction of the first portion of the at least one of the first opening edge and the second opening edge and an extending direction of the second portion of the at least one of the first opening edge and the second opening edge are different with each other, an orthogonal projection of the first portion of the at least one of the first opening edge and the second opening edge on the first substrate is parallel to an orthogonal projection of the second signal line on the first substrate, the second portion of the at least one of the first opening edge and the second opening edge and one of the third opening edge and the fourth opening edge are connected to form a protruding angle, and the protruding angle protrudes towards a direction away from a center of the opening.

According to the above descriptions, in the display panel of an embodiment of the invention, the first portion of the shielding layer is used to define the non-rectangular display region. Particularly, the inner contour of the first portion of the shielding layer is parallel to the first signal line and the second signal line of the pixel unit, and the inner contour of the first portion of the shielding layer substantially presents a serrated edge with a tiny tooth pitch. In this way, regardless of a shape of the non-rectangular display region to be realized, by using the aforementioned design principle, the free-form non-rectangular display region can be easily and quickly designed, so as to realize display panel with the non-rectangular display region.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1b is a part R of the display panel of FIG. 1a.

DESCRIPTION OF EMBODIMENTS

Figure 1A:
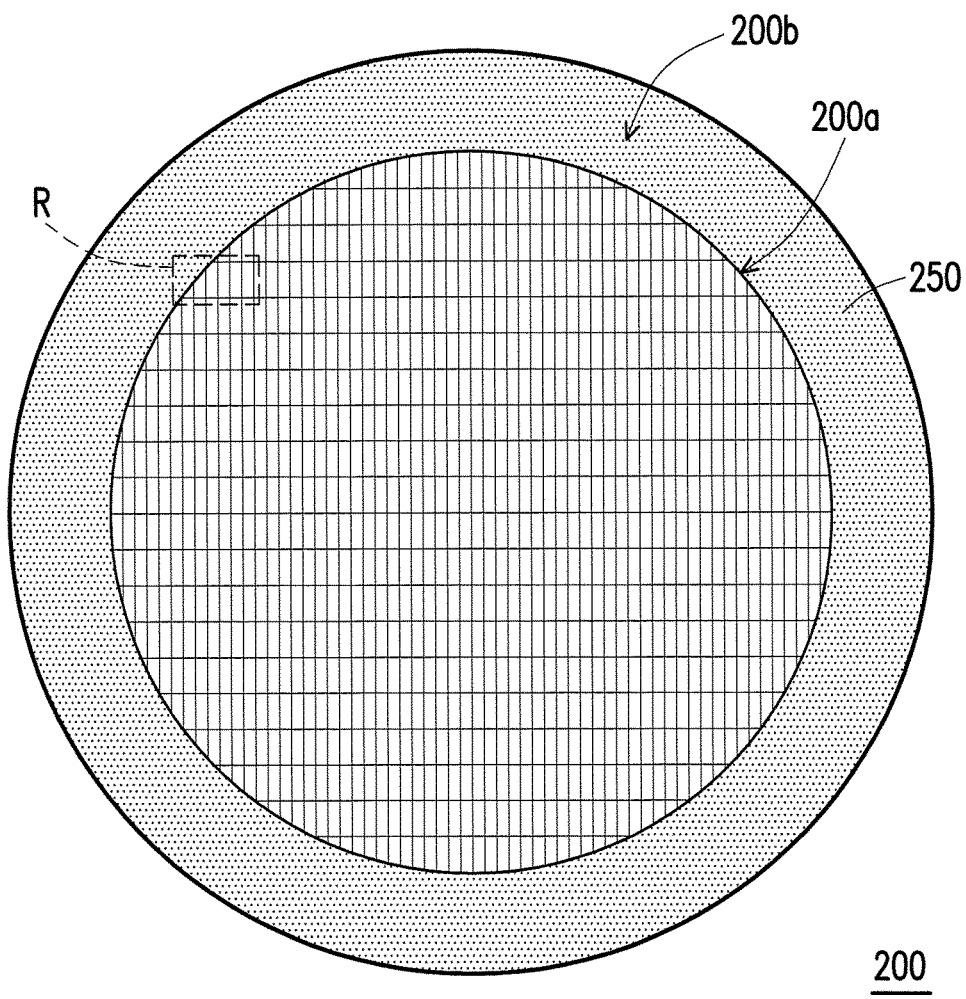
FIG. 1a is a top view of a conventional display panel having a circular display region.
Figure 1B:
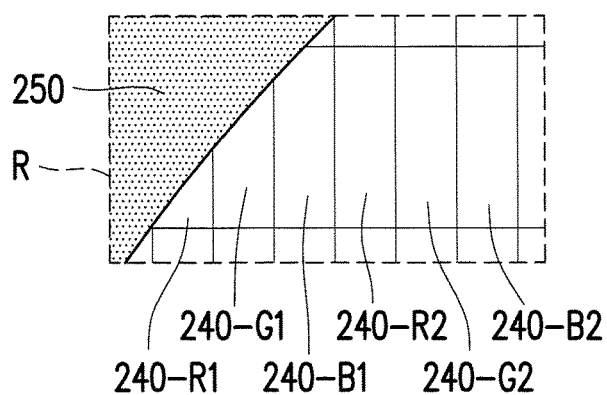
Figure 2:
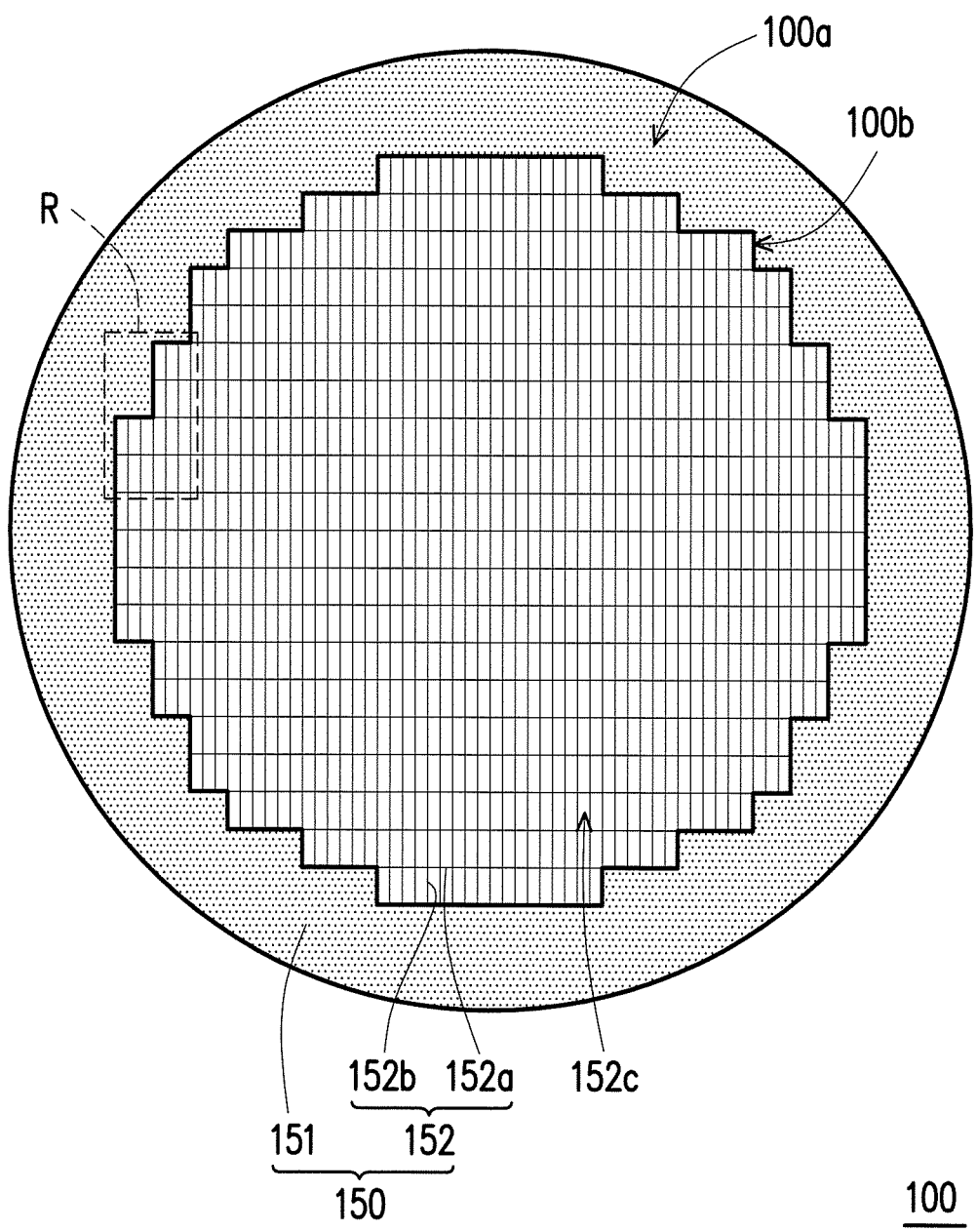
FIG. 2 is a top view of a display panel according to an embodiment of the invention.
Figure 3:
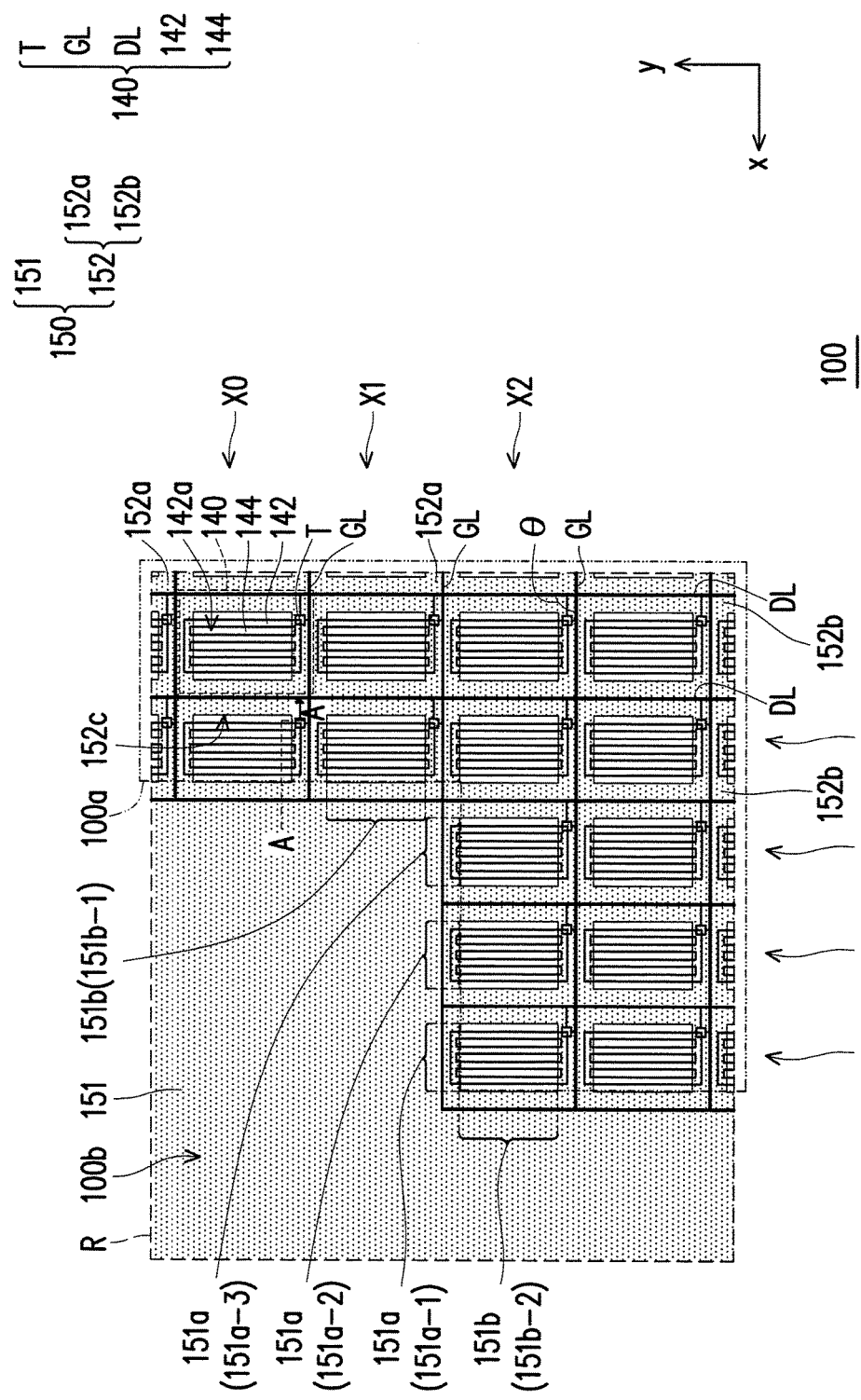
FIG. 3 is a partial enlarged view of a display panel according to an embodiment of the invention.
Figure 4:
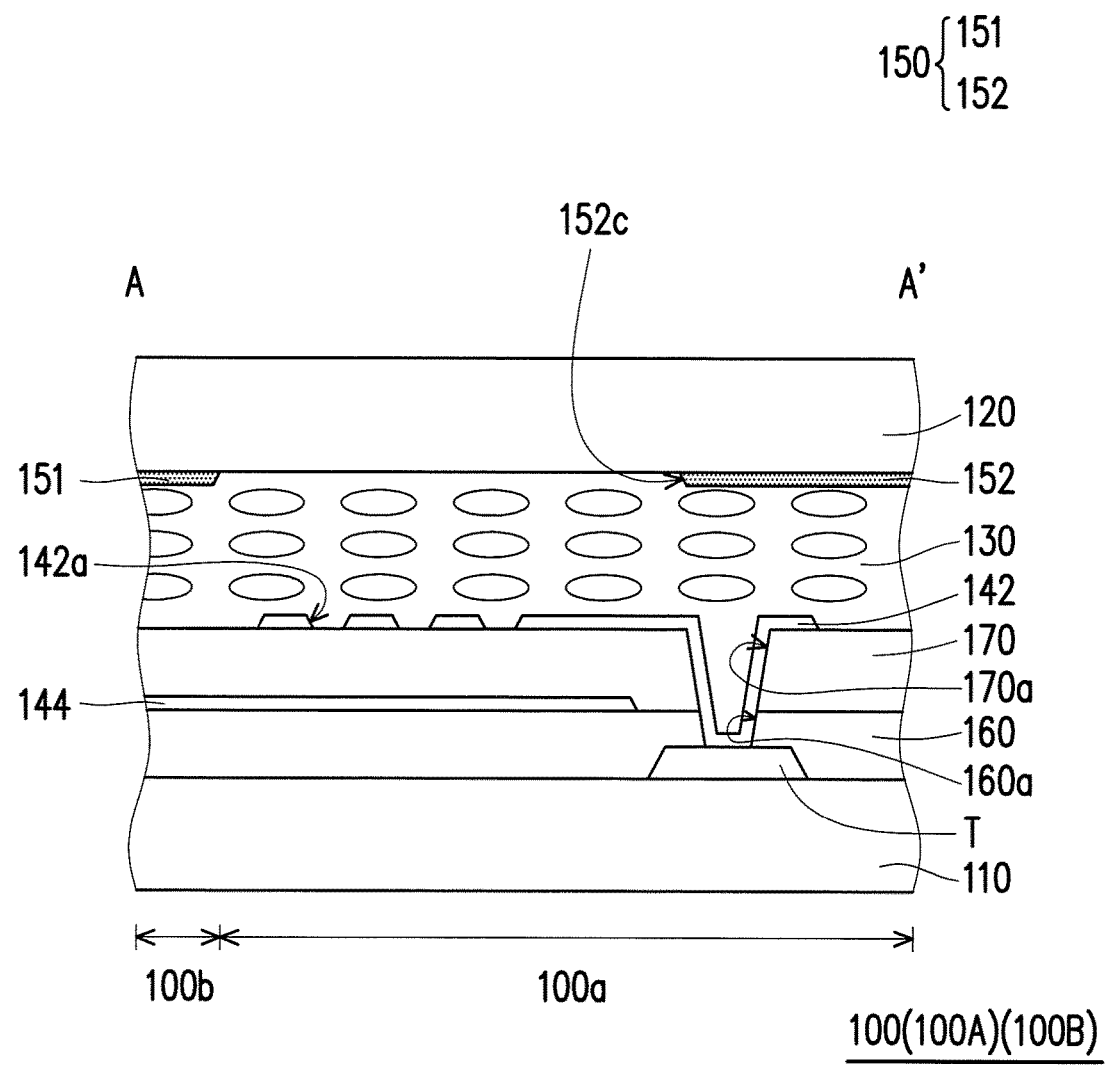
FIG. 4 is a cross-sectional view of a display panel according to an embodiment of the invention.

FIG. 2 is a top view of a display panel according to an embodiment of the invention. FIG. 3 is a partial enlarged view of the display panel according to an embodiment of the invention. Particularly, FIG. 3 corresponds to the part R of FIG. 2. FIG. 4 is a cross-sectional view of the display panel according to an embodiment of the invention. Particularly, FIG. 4 corresponds to a section line A-A' of FIG. 3. Referring to FIG. 2 and FIG. 3, the display panel 100 has a non-rectangular display region 100a and a peripheral region 100b. The peripheral region 100b is located outside the non-rectangular display region 100a. For example, as shown in FIG. 2, in the present embodiment, the non-rectangular display region 100a may be similarly circular. However, it should be noted that the disclosure is not limited thereto. In other embodiments, the non-rectangular display region 100a may be similarly oval, semi-circular, a bow shape, a triangle form, a pentagon faun, a hexagon form, or other non-rectangle shapes.

Referring to FIG. 3 and FIG. 4, the display panel 100 includes a first substrate 110, a second substrate 120, a display medium 130, a plurality of pixel units 140 and a shielding layer 150. As shown in FIG. 3, the second substrate 120 is disposed opposite to the first substrate 110. The display medium 130 is disposed between the first substrate 110 and the second substrate 120. In the present embodiment, at least one of the first substrate 110 and the second substrate 120 is transparent. A material of the first substrate 110 and a material of the second substrate 120 may be the same or different. The materials of the first substrate 110 and the second substrate 120 can be selected from glass, quartz, organic polymers, opaque/reflective materials (for example, conductive materials, wafers, ceramic, etc.) or other proper materials. The display medium 130 is, for example, liquid crystal, but the invention is not limited thereto. In other embodiments, the display medium 130 may also be an organic electroluminescent layer or other proper materials.

Referring to FIG. 3 and FIG. 4, the pixel units 140 are disposed on the first substrate 110 and are located on the non-rectangular display region 110a. Each of the pixel units 140 includes a thin-film transistor T, a first signal line GL electrically connected to the thin-film transistor T and a second signal line DL electrically connected to the thin-film transistor T and a pixel electrode 142 electrically connected to the thin-film transistor T. The thin-film transistor T has a gate (not shown), a semiconductor pattern (not shown) overlapped to the gate and a source (not shown) and a drain (not shown) electrically connected to two sides of the semiconductor pattern. One of the first signal line GL and the second signal line DL can be a gate line, and the gate line is electrically connected to the gate of the thin-film transistor T. The other one of the first signal line GL and the second signal line DL can be a data line, and the data line is electrically connected to the source of the thin-film transistor T. The pixel electrode 140 is filled into an opening 160a of an insulation layer 160 and an opening 170a of an insulation layer 170 to electrically connect to the drain (not shown) of the thin-film transistor T.

Referring to FIG. 3, an extending direction of the first signal line GL is different with an extending direction of the second signal line DL. The first signal line GL and the second single line DL belong to different film layers, and are crossed to each other. In the present embodiment, the first signal line GL and the second signal line DL may be a straight line foal'. An included angle between an orthogonal projection of the first signal line GL on the first substrate 110 and an orthogonal projection of the second signal line DL on the first substrate 110 is θ, and θ may be selectively 90°. However, the invention is not limited thereto. In other embodiments, the forms of the first signal line GL and the second signal line DL and the included angle θ between the first signal line GL and the second signal line DL can be properly designed according to an actual requirement, which are described later with reference of other figures.

Referring to FIG. 3 and FIG. 4, each of the pixel units 120 may further include a common electrode 144 overlapped with the pixel electrode 142. A potential difference between the pixel electrode 142 and the common electrode 144 can drive the display medium 130, such that the display panel 100 can display an image. In the present embodiment, the pixel electrode 142 and the common electrode 144 may be selectively disposed on a same substrate (i.e. the first substrate 110). An insulation layer 170 may be disposed between the pixel electrode 142 and the common electrode 144. One of the pixel electrode 142 and the common electrode 144 has a plurality of slits, and the slits expose the other one of the pixel electrode 142 and the common electrode 144. In the present embodiment, the pixel electrode 142 may be located above the insulation layer 170, and the common electrode 144 may be located below the insulation layer 170, and the pixel electrode 142 has a plurality of slits 142a to expose the common electrode 144. However, the invention is not limited thereto, and in other embodiments, the pixel electrode 142 may be disposed below the insulation layer 170, and the common electrode 144 may be located above the insulation layer 170, and the common electrode 144 has a plurality of slits to expose the pixel electrode 142. Moreover, in some embodiments, the pixel electrode 142 and the common electrode 144 may respectively have a plurality of slits, and viewing from the direction perpendicular to the pixel electrode 142 or the common electrode 144, the slits of the pixel electrode 142 and the slits of the common electrode 142 may be arranged alternately. In the present embodiment, the display panel 100 may be a fringe field switching (FFS) mode. However, the invention is not limited thereto, and in another embodiment, if the pixel electrode 142 and the common electrode 144 are disposed on the same substrate, the display panel 100 may also be an in-plane switching (IPS) mode or other proper mode. In another embodiment, the pixel electrode 142 and the common electrode 144 may be respectively disposed on the first substrate 110 and the second substrate 120, and the display panel 100 may be a twisted nematic (TN) mode, a vertical alignment (VA) mode, an optically compensated bend (OCB) mode or other proper mode.

Referring to FIG. 3 and FIG. 4, the shielding layer 150 can shield light. Referring to FIG. 4, in the present embodiment, the shielding layer 150 may be selectively disposed on the second substrate 120. The shielding layer 150 may be called a black matrix layer. A material of the shielding layer 150 is, for example, black resin. However, the invention is not limited thereto, and in other embodiments, the material of the shielding layer 150 can also be other light-shielding materials. Moreover, in the invention, the shielding layer 150 is not limited to be disposed on the second substrate 120. In other embodiments, the shielding layer 150 may be selectively disposed on the same substrate (i.e. the first substrate 110) with the thin-film transistor T and the pixel electrode 142, such that the shielding layer 150 and a color filter layer (not shown) disposed on the same substrate form a color filter on array (COA) structure.

Referring to FIG. 2 and FIG. 3, the shielding layer 150 includes a first portion 151 and a second portion 152. The first portion 151 is located on the peripheral region 100b. The second portion 152 located on the non-rectangular display region 100a. The second portion 152 of the shielding layer 150 covers at least one of the first signal line GL, the second signal line DL and the thin-film transistor T of each of the pixel units 140. For example, in the present embodiment, the second portion 152 of the shielding layer 150 may cover the first signal line GL, the second signal line DL and the thin-film transistor T of each of the pixel units 140. In detail, the second portion 152 of the shielding layer 150 may have a mesh pattern, and the mesh pattern is composed of a plurality of line segments 152a and a plurality of line segments 152b crossed to each other. The line segments 152a of the mesh pattern may shield the first signal line GL. The line segments 152b of the mesh pattern may shield the second signal line DL. However, the invention is not limited thereto, and in other embodiments, if a light leakage problem can be solved by a manufacturing process or a layout, the second portion 152 of the shielding layer 150 does not have to completely shield the first signal line GL, the second signal line DL and the thin-film transistor T. For example, in some embodiments, the second portion 152 of the shielding layer 150 may present a plurality of block patterns to shield the thin-film transistors T, or present a plurality of stripe patterns to shield at least one of the thin-film transistors T, the first signal lines GL and the second signal lines DL of each of the pixel units 140.

Referring to FIG. 2 and FIG. 3, the second portion 152 of the shielding layer 150 has a plurality of openings 152c. Each of the openings 152c corresponds to one pixel unit 140. In the present embodiment, edges of the opening 152c of the second portion 152 of the shielding layer 150 may be respectively parallel to the first signal line GL and the second signal line DL. Further, in the present embodiment, the opening 152c may present a shape of a rectangle, and four sides of the rectangle can be parallel to the first signal line GL and the second signal line DL. However, the invention is not limited thereto. In other embodiments, the opening 152c can be designed into other proper shapes, which is described later with reference of other figures.

Figure 5:
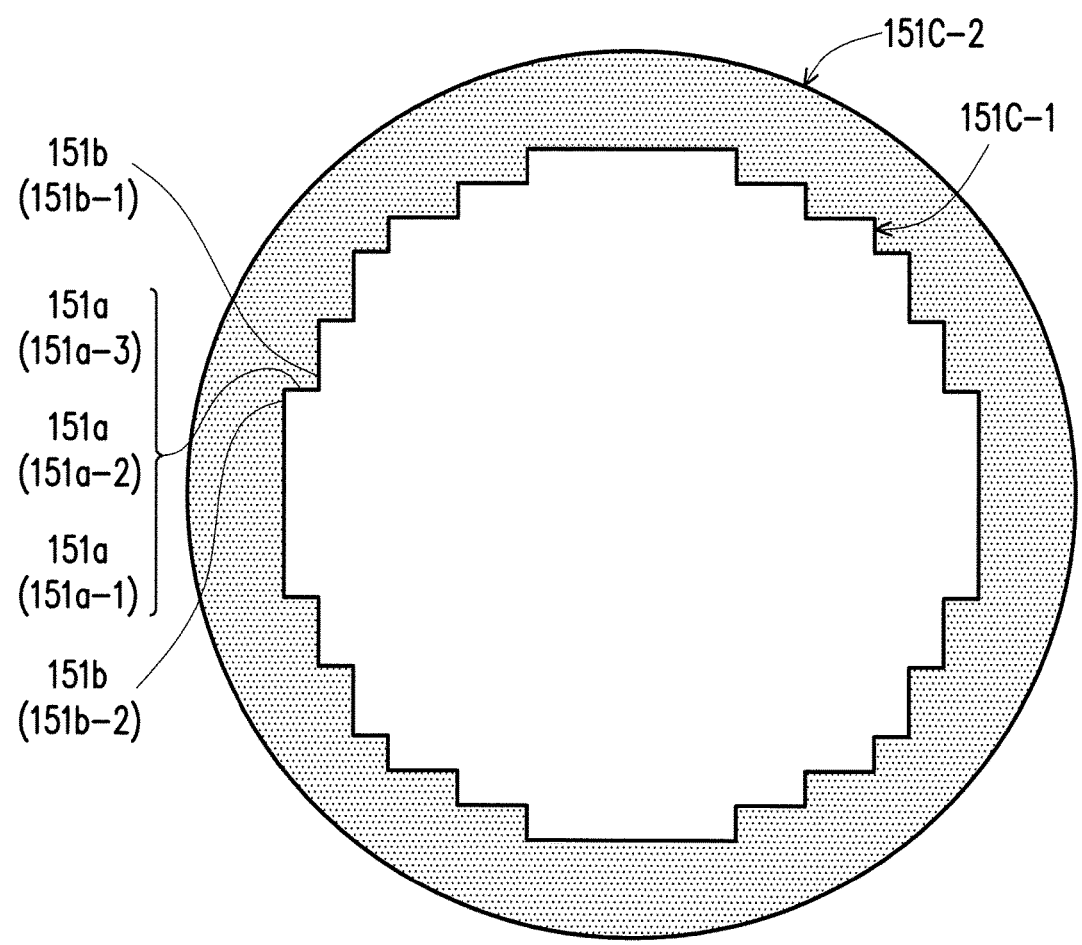
FIG. 5 is a top view of an orthogonal projection of a first portion of a shielding layer on a first substrate according to an embodiment of the invention.

Referring to FIG. 2, FIG. 3 and FIG. 5, FIG. 5 is a top view of an orthogonal projection of the first portion 151 of the shielding layer 150 on the first substrate 110. The orthogonal projection of the first portion 151 of the shielding layer 150 on the first substrate 110 includes an inner contour 151C-1 and an outer contour 151C-2, and the inner contour 151C-1 of the orthogonal projection of the first portion 151 of the shielding layer 150 on the first substrate 110 defines the non-rectangular display region 100a. In other words, the inner contour 151C-1 of the orthogonal projection of the first portion 151 of the shielding layer 150 on the first substrate 110 is overlapped with an edge of the non-rectangular display region 100a. The inner contour 151C-1 includes a plurality of first line segments 151a and a plurality of second line segments 151b. The first line segments 151a are parallel to an orthogonal projection of the first signal line GL on the first substrate 110. The second line segments 151b are parallel to an orthogonal projection of the second signal line DL on the first substrate 110. Namely, viewing from a direction perpendicular to the first substrate 110, the first line segments 151a are parallel to the first signal line GL, and the second line segments 151b are parallel to the second signal line DL. The pixel units 140 are arranged in a plurality of pixel rows X0, X1, X2 and a plurality of pixel columns Y1, Y2, Y3, and Y4. The pixel units 140 of the same pixel row X0, X1 or X2 are arranged along a column direction x. The pixel units 140 of the same pixel column Y1, Y2, Y3 or Y4 are arranged along a row direction y. In the present embodiment, an area of each of the pixel units 140 of each pixel row X0, X1 or X2 may be the same, and the area of each of the pixel units 140 of each pixel column Y1, Y2, Y3 or Y4 may be the same, and the first line segments 151a and the second line segments 151b are respectively parallel to the orthogonal projections of the first signal line GL and the second signal line DL on the first substrate 110. In other words, viewing from the direction perpendicular to the first substrate 110, the inner contour 151C-1 of the shielding layer 150 extends along outer edges of the pixel units 140 located at the edge of the non-rectangular display region 100a, so that an area and an aperture ratio of the pixel unit 140 located at the edge of each pixel row X0, X1 or X2 are the same to the area and aperture ratio of the other pixel units 140 in the same pixel row, and an area and an aperture ratio of the pixel unit 140 located at the edge of each pixel column Y1, Y2, Y3 or Y4 are the same to the area and aperture ratio of the other pixel units 140 in the same pixel column, so as to avoid causing color unbalance or brightness unevenness at the edge of the non-rectangular display region 100a.

Referring to FIG. 2 and FIG. 3, the next pixel row of the pixel row X1 is the pixel row X2. Viewing from the direction perpendicular to the first substrate 110, one second line segment 151b-1 of the first portion 151 of the shielding layer 150 is parallel to the second signal line DL of the pixel unit 140 of the pixel row X1. Another second line segment 151b-2 of the first portion 151 of the shielding layer 150 is parallel to the second signal line DL of the pixel unit 140 of the pixel row X2. At least one pixel unit 140 of the pixel row X2 (for example, the leftmost three pixel units 140 of the pixel row X2) are staggered with a plurality of pixel units 140 of the pixel row X1. In other words, at least one pixel unit 140 of the pixel row X2 exceeds the plurality of pixel units 140 of the pixel row X1. At least one first line segments 151a-1, 151a-2, 151a-3 of the first portion 151 of the shielding layer 150 are parallel to the orthogonal projection of the first signal line GL of the at least one pixel unit 140 of the pixel row X2 that exceeds the first pixel row X1 (for example, the leftmost three pixel units 140 of the pixel row X2) on the first substrate 110. The second line segment 151b-1, the first line segment 151a-3, the first line segment 151a-2, the first line segment 151a-1 and the second line segment 151b-2 can be located on a single fold line, and the fold line defines the edge of the non-rectangular display region 100a.

It should be noted that the first portion 151 of the shielding layer 150 is used to define the non-rectangular display region 100a of the display panel 100, and the inner contour 151C-1 of the orthogonal projection of the first portion 151 of the shielding layer 150 on the first substrate 110 includes a plurality of the first line segments 151a and the second line segments 151b respectively parallel to the orthogonal projections of the first signal line GL and the second signal line of the pixel unit 140 on the first substrate 110, so that the inner contour of the first portion 151 of the shielding layer 150 substantially presents a serrated edge with a tiny tooth pitch (as shown in FIG. 2 and FIG. 5). It should be noted that the number of the pixel units 140 of FIG. 2 is only an example, and since a pitch of the pixel units 140 is generally several micrometers to tens of micrometers, the number of the pixels per inch is above several hundreds, and the size of the non-rectangular display region 100a is generally above one inch, regarding a usage distance of a user, human eyes cannot identify the serrated edge of the non-rectangular display region 100a, instead, the human eyes may view the edge of the non-rectangular display region 100a with a smooth curve or slashes. In this way, regardless of the shape of the non-rectangular display region 100a to be realized, the free-form non-rectangular display region 100a of any free-form can be easily and quickly designed by using the aforementioned design principle, and the problem of color unbalance or brightness unevenness at the edge of the non-rectangular display region 100a is avoided, so as to realize the display panel 100 having the non-rectangular display region 100a.

In the present embodiment, the shielding layer 150 includes a first portion 151 located on the peripheral region 100b and a second portion 152 located on the non-rectangular display region 100a, the first portion 151 of the shielding layer 150 is used to shield the peripheral region 100b and define the non-rectangular display region 100a, and the second portion 152 of the shielding layer 150 may cover at least one of the first signal line GL, the second signal line DL and the thin-film transistor T of each of the pixel units 140 (i.e. the second portion 152 of the shielding layer 150 shield a part of the non-rectangular display region 100a). However, the invention is not limited thereto, and in another embodiment, the peripheral region 100b and a part of the non-rectangular display region 100a may be shielded by two different shielding layers respectively, an inner contour of an orthogonal projection of the shielding layer located on the peripheral region 100b on the first substrate comprises a plurality of first line segments and a plurality of second line segments, the first line segments are respectively parallel to orthogonal projections of the corresponding first signal lines on the first substrate, and the second line segments are respectively parallel to orthogonal projections of the corresponding second signal lines on the first substrate. In other embodiment, if each of the pixel units 140 is not partly covered by a shielding layer, and a shielding layer is only located on the peripheral region 100b to shield the peripheral region 100b and define the non-rectangular display region 100a, an inner contour of an orthogonal projection of the shielding layer on the first substrate comprises a plurality of first line segments and a plurality of second line segments, the first line segments are respectively parallel to orthogonal projections of the corresponding first signal lines on the first substrate, and the second line segments are respectively parallel to orthogonal projections of the corresponding second signal lines on the first substrate.

Figure 6:
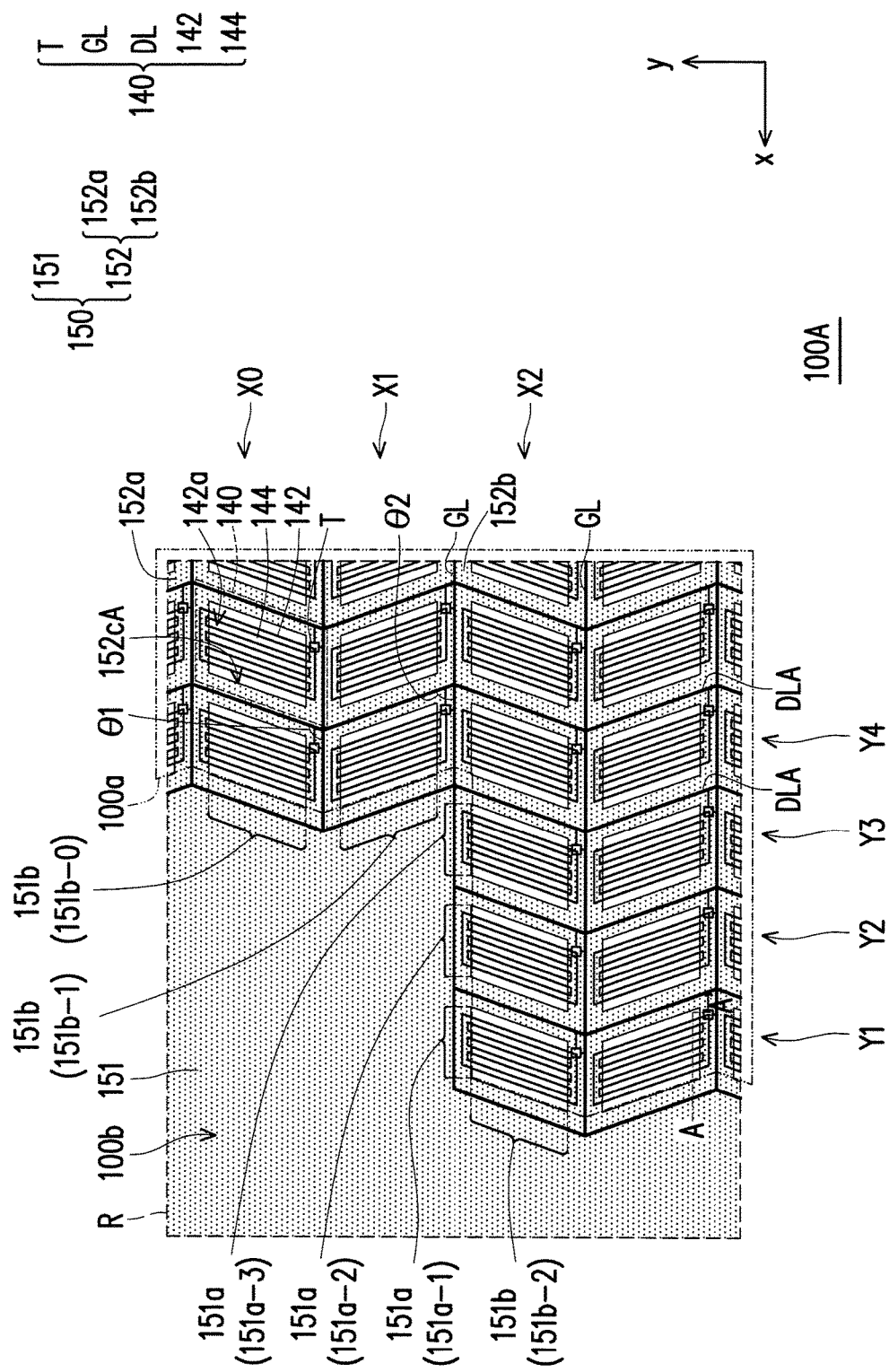
FIG. 6 is a partial enlarged view of a display panel according to an embodiment of the invention.

FIG. 6 is a partial enlarged view of a display panel according to an embodiment of the invention. The section line A-A' of FIG. 6 also corresponds to FIG. 4. The display panel 100A of FIG. 6 is similar to the aforementioned display panel 100, so that the same or similar components are denoted by the same or similar referential numbers. A main difference between the display panel 100A and the display panel 100 is that a pattern of a second signal line DLA of the display panel 100A is different to the pattern of the second signal line DL of the display panel, and a shape of an opening 152cA of the display panel 100A is different to the shape of the opening 152c of the display panel 100. The above differences are described in detail below, and the same or similar parts of the two embodiments may refer to related description of the aforementioned embodiment.

Referring to FIG. 4 and FIG. 6, the display panel 100A has a non-rectangular display region 100a and a peripheral region 100b outside the non-rectangular display region 100a. The display panel 100A includes a first substrate 110, a plurality of pixel units 140 disposed on the first substrate 110 and located on the non-rectangular display region 100a and a shielding layer 150. Each of the pixel units 140 includes a thin-film transistor T, a first signal line GL and a second signal line DLA electrically connected to the thin-film transistor T. An extending direction of the first signal line GL is different with an extending direction of the second signal line DLA. The shielding layer 150 includes a first portion 151 located on the peripheral region 100b and a second portion 152 located on the non-rectangular display region 100a. An inner contour of an orthogonal projection of the first portion 151 of the shielding layer 150 on the first substrate 110 is overlapped with the edge of the non-rectangular display region 100a. The inner contour includes a plurality of first line segments 151a and a plurality of second line segments 151b. The first line segments 151a are respectively parallel to orthogonal projections of the corresponding first signal lines GL on the first substrate 110. The second line segments 151b are respectively parallel to orthogonal projections of the corresponding second signal lines DLA on the first substrate 110.

Referring to FIG. 6, a main difference between the display panel 100A and the display panel 100 is that the second signal line DLA of the display panel 100A is a fold line rather than a straight line. Included angles θ1 and θ2 between the first signal line GL and the second signal line DLA are not 90°. Moreover, compared to the display panel 100, an included angle between an orthogonal projection of the extending direction of the slit 142a of the pixel electrode 142 on the first substrate 110 and an orthogonal projection of the extending direction of the first signal line GL on the first substrate 110 is not 90°, and the extending directions of the slits 142a in two adjacent pixel rows are different, such that two different domains are formed and a viewing angle of the display panel 100A is enlarged. The next pixel row of the pixel row X0 is the pixel row X1. An included angle between an orthogonal projection of the first signal line GL of the pixel unit 140 of the pixel row X0 on the first substrate 110 and an orthogonal projection of the second signal line DLA of the pixel unit 140 of the pixel row X0 on the first substrate 110 is θ1, and an included angle between an orthogonal projection of the extending direction of the slit 142a of the pixel electrode 142 of the pixel unit 140 of the pixel row X0 on the first substrate 110 and the orthogonal projection of the extending direction of the first signal line GL on the first substrate 110 is also θ1. An included angle between an orthogonal projection of the first signal line GL of the pixel unit 140 of the pixel row X1 on the first substrate 110 and an orthogonal projection of the second signal line DLA of the pixel unit 140 of the pixel row X1 on the first substrate 110 is θ2, and an included angle between an orthogonal projection of the extending direction of the slit 142a of the pixel electrode 142 of the pixel unit 140 of the pixel row X1 on the first substrate 110 and the orthogonal projection of the extending direction of the first signal line GL on the first substrate 110 is also θ2. In the present embodiment, $75°≤θ1≤105°$, $θ1≠90°$, $75°≤θ2≤105°$, $θ2≠90°$. Further, $θ1=(90°+α)$, $θ2=(90°-α)$. In the present embodiment, $0°<α≤15°$. For example, $α=7°$, i.e., $θ1=97°$, $θ2=83°$, but the invention is not limited thereto. In brief, inclining directions of the two second signal lines DLA of two adjacent pixel units 140 in the same pixel column Y4 are opposite to each other, and the two second signal lines DLA are connected to form a V-shape line segment. The two second line segments 151b-0, 151b-1 of the inner contour of the orthogonal projection of the first portion 151 of the shielding layer 150 on the first substrate 110 are respectively parallel to the orthogonal projections of the two second signal lines DLA of two adjacent pixel units 140 located in the same pixel column Y4 on the first substrate 110, and the second line segment 151b-0 and the second line segment 151b-1 are also connected to foam a V-shape line segment.

Referring to FIG. 6, the shielding layer 150 includes the second portion 152 located in the non-rectangular display region 100a. The second portion 152 of the shielding layer 150 has a plurality of openings 152cA. Each of the openings 152cA corresponds to one pixel unit 140. Viewing from a direction perpendicular to the first substrate 110, edges of one opening 152cA of the second portion 152 of the shielding layer 150 may be respectively parallel to the first signal line GL and the second signal line DLA of the corresponding pixel unit 140. For example, in the present embodiment, the opening 152cA may be a parallelogram, and viewing from the direction perpendicular to the first substrate 110, the four sides of the parallelogram can be respectively parallel to the corresponding first signal line GL and the second signal line DLA. The display panel 100A has similar effects and advantages with that of the display panel 100, and details thereof are not repeated.

Figure 7:
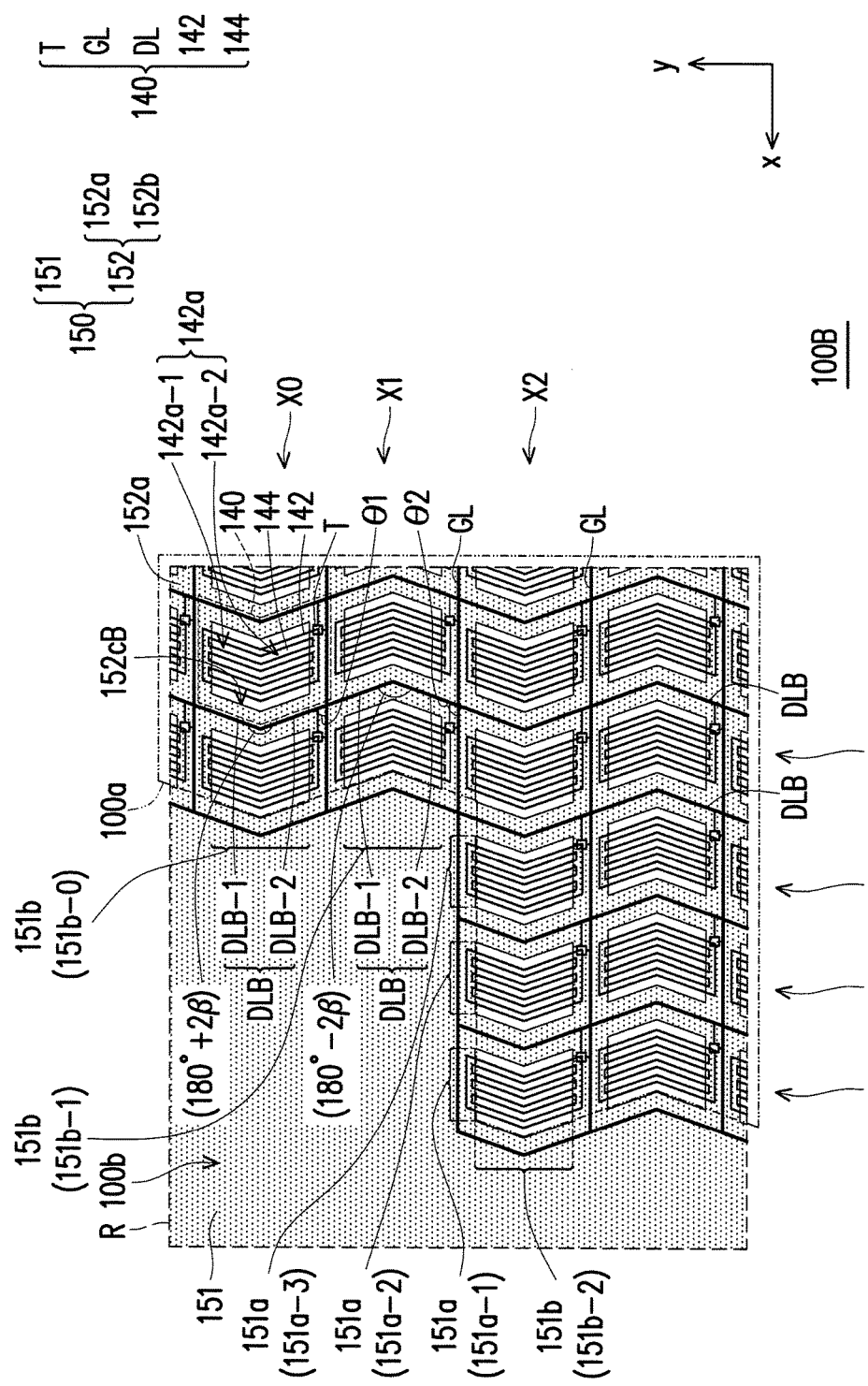
FIG. 7 is a partial enlarged view of a display panel according to an embodiment of the invention.

FIG. 7 is a partial enlarged view of a display panel according to an embodiment of the invention. The section line A-A' of FIG. 7 also corresponds to FIG. 4. The display panel 100B of FIG. 7 is similar to the aforementioned display panel 100, so that the same or similar components are denoted by the same or similar referential numbers. A main difference between the display panel 100B and the display panel 100 is that a pattern of a second signal line DLB of the display panel 100B is different to the pattern of the second signal line DL of the display panel 100, and a shape of an opening 152cB of the display panel 100B is different to the shape of the opening 152c of the display panel 100. The above differences are described in detail below, and the same or similar parts of the two embodiments may refer to related description of the aforementioned embodiment.

Referring to FIG. 4 and FIG. 7, the display panel 100B has a non-rectangular display region 100a and a peripheral region 100b outside the non-rectangular display region 100a. The display panel 100B includes a first substrate 110, a plurality of pixel units 140 disposed on the first substrate 110 and located on the non-rectangular display region 100a and a shielding layer 150. Each of the pixel units 140 includes a thin-film transistor T, a first signal line GL and a second signal line DLB electrically connected to the thin-film transistor T. An extending direction of the first signal line GL is different with an extending direction of the second signal line DLB. The shielding layer 150 includes a first portion 151 located on the peripheral region 100b and a second portion 152 located on the non-rectangular display region 100a. An inner contour of an orthogonal projection of the first portion 151 of the shielding layer 150 on the first substrate 110 is overlapped with the edge of the non-rectangular display region 100a. The inner contour includes a plurality of first line segments 151a and a plurality of second line segments 151b. The first line segments 151a are respectively parallel to orthogonal projections of the corresponding first signal lines GL on the first substrate 110. The second line segments 151b are respectively parallel to orthogonal projections of the corresponding second signal lines DLB on the first substrate 110.

Referring to FIG. 7, a main difference between the display panel 100B and the display panel 100 is that included angles θ1 and θ2 between the first signal line GL and the second signal line DLB are not 90°, and the second signal line DLB of the display panel 100B is a fold line rather than a straight line. In detail, the second signal line DLB of each pixel unit 140 includes a first portion DLB-1 and a second portion DLB-2 extending towards different directions. Moreover, compared to the display panel 100, an included angle between an orthogonal projection of the extending direction of the slit 142a of the pixel electrode 142 on the first substrate 110 and an orthogonal projection of the extending direction of the first signal line GL on the first substrate 110 is not 90°, and the slit 142a in each of the pixel units 140 includes a first portion 142a-1 and a second portion 142a-2 extending towards different direction, such that two different domains are formed and a viewing angle of the display panel 100B is enlarged. In the present embodiment, $75°≤θ1≤105°$, $θ1≠90°$, $75°≤θ2≤105°$, $θ2≠90°$. Further, $θ1=(90°-β)$, $θ2=(90°+β)$, where in $0°<β≤15°$. An included angle between the orthogonal projection of first portion DLB-1 of the second signal line DLB on the first substrate 110 and the orthogonal projection of the second portion DLB-2 of the second signal line DLB on the first substrate 110 is (180°−β2β) or (180°+ 2β), wherein 0°<β≤15°. For example, β=7°, though the invention is not limited thereto.

Referring to FIG. 7, further, the next pixel row of the pixel row X0 is the pixel row X1. The included angle of the pixel unit 140 located in the pixel row X0 and the pixel column Y4 is (180°+2β), and the included angle of the pixel unit 140 located in the pixel row X1 and the pixel column Y4 is (180°−2β). In other words, the two second signal lines DLB of the two adjacent pixel units 140 in the same pixel column Y4 may be respectively two V-shaped line segments with opposite protruding directions, and the two second signal lines DLB may be connected to each other so as to form a S-shape line segment. Similarly, the included angle between the first portion 142a-1 and the second portion 142a-2 of the slit 142a of the pixel unit 140 located in the pixel row X0 and the pixel column Y4 is (180°+2β), and the included angle between the first portion 142a-1 and the second portion 142a-2 of the slit 142a of the pixel unit 140 located in the pixel row X1 and the pixel column Y4 is (180°−2β). The two second line segments 151b-0, 151b-1 of the first portion 151 of the shielding layer 150 are respectively parallel to the orthogonal projections of the two second signal lines DLB of two adjacent pixel units 140 located in the same pixel column Y4 on the first substrate 110, and the second line segment 151b-0 and the second line segment 151b-1 are also connected to each other so as to form a S-shape line segment.

Referring to FIG. 7, the shielding layer 150 includes the second portion 152 located in the non-rectangular display region 100a. The second portion 152 of the shielding layer 150 has a plurality of openings 152cB. Each of the openings 152cB corresponds to one pixel unit 140. In the present embodiment, viewing from the direction perpendicular to the first substrate 110, edges of one opening 152cB of the second portion 152 of the shielding layer 150 can be respectively parallel to the first signal line GL and the second signal line DLB of the corresponding pixel unit 140. For example, the opening 152cA can be a polygon, and two fold line edges of the polygon can be respectively parallel to the corresponding second signal line DLB, and two straight line edges of the polygon can be respectively parallel to the corresponding first signal line GL. The display panel 100B has similar effects and advantages with that of the display panel 100, and details thereof are not repeated.

Figure 8:
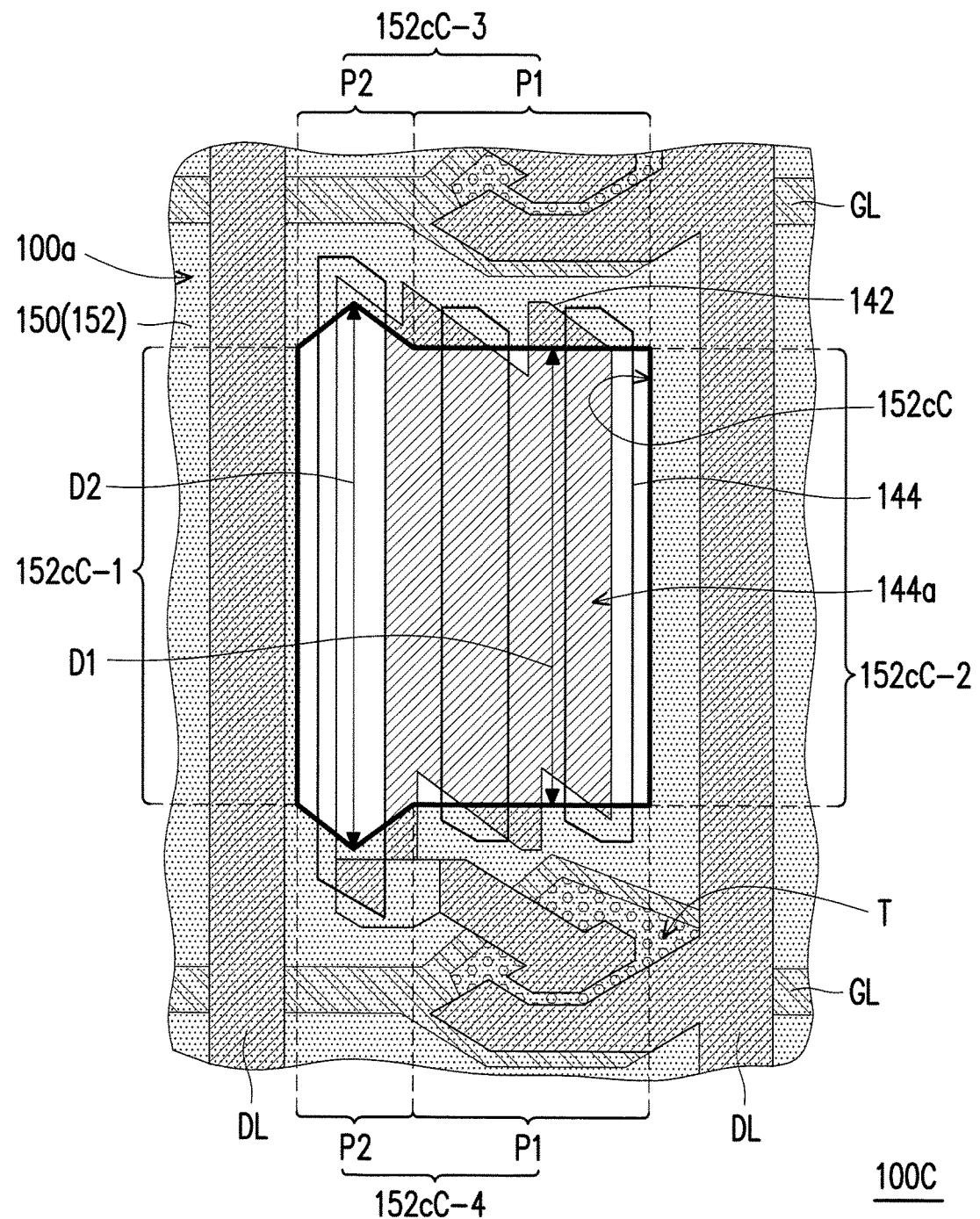
FIG. 8 is a partial top view of a non-rectangular display region of a display panel according to an embodiment of the invention.

FIG. 8 is a partial top view of a non-rectangular display region of a display panel according to an embodiment of the invention. The display panel 100C of FIG. 8 is similar to the aforementioned display panel 100, so that the same or similar components are denoted by the same or similar referential numbers. A main difference between the display panel 100C and the display panel 100 is that a shape of an opening 152cC of the display panel 100C is different to the shape of the opening 152c of the shielding layer 150 of the display panel 100. The above difference is described in detail below, and the same or similar parts of the two embodiments may refer to related description of the aforementioned embodiment.

Referring to FIG. 8, the second portion 152 of the shielding layer 150 is located on the non-rectangular display region 100a. The second portion 152 of the shielding layer 150 covers at least one of the first signal line GL, the second signal line DL and the thin-film transistor T of each of the pixel units 140. The second portion 152 of the shielding layer 150 has a plurality of openings 152cC. Each of the openings 152cC corresponds to one pixel unit 140. The opening 152cC has a first opening edge 152cC-1, a second opening edge 152cC-2, a third opening edge 152cC-3 and a fourth opening edge 152cC-4. The first opening edge 152cC-1 and the second opening edge 152cC-2 are opposite to each other. The third opening edge 152cC-3 is connected between the first opening edge 152cC-1 and the second opening edge 152cC-2. The fourth opening edge 152cC-4 is opposite to the third opening edge 152cC-3. The fourth opening edge 152cC-4 is connected between the first opening edge 152cC-1 and the second opening edge 152cC-2. Orthogonal projections of the first opening edge 152cC-1 and the second opening edge 152cC-2 on the first substrate 110 can be parallel to the orthogonal projection of the second signal line DL on the first substrate 110. At least one of the third opening edge 152cC-3 and the fourth opening edge 152cC-4 includes a first portion P1 and a second portion P2 having an extending direction different with that of the first portion P1. An orthogonal projection of the first portion P1 on the first substrate 110 is parallel to the orthogonal projection of the first signal line GL on the first substrate 110. An orthogonal projection of the second portion P2 on the first substrate 110 is not parallel to the orthogonal projection of the first signal line GL on the first substrate 110.

For example, in the present embodiment, viewing from the direction perpendicular to the first substrate, the third opening edge 152cC-3 includes the first portion P1 parallel to the first signal line GL and the second portion P2 not parallel to the first signal line GL. The fourth opening edge 152cC-4 includes the first portion P1 parallel to the first signal line GL and the second portion P2 not parallel to the first signal line GL. A distance D2 between the second portion P2 of the third opening edge 152cC-3 and the second portion P2 of the fourth opening edge 152cC-4 is greater than a distance D1 between the first portion P1 of the third opening edge 152cC-3 and the first portion P1 of the fourth opening edge 152cC-4. Viewing from the direction perpendicular to the first substrate 110, the distance D1 and the distance D2 are calculated along a direction parallel to the extending direction of the second signal line DL. The second portion P2 of the third opening edge 152cC-3 is connected between the first portion P1 of the third opening edge 152cC-3 and the first opening edge 152cC-1, and may be a V-shape fold line recessed toward an inner of the second portion 152 of the shielding layer 150. The second portion P2 of the fourth opening edge 152cC-4 is connected between the first portion P1 of the fourth opening edge 152cC-4 and the first opening edge 152cC-1, and can be a V-shape polyline recessed into the second portion 152 of the shielding layer 150.

Compared to the embodiments of FIG. 2, FIG. 3 and FIG. 4, the pixel electrode 142 of the present embodiment is located under the isolation layer 170, and the common electrode 144 is located above the isolation layer 170, and the common electrode 144 has a plurality of slits 144a to expose the pixel electrode 142. As shown in FIG. 8, since the thin-film transistor T is electrically connected to a lower left side of the pixel electrode 142, viewing from the direction perpendicular to the first substrate 110, a left side of the pixel electrode 142 has a longer length along the direction parallel to the second signal line DL, such that the leftmost slit 144a in the common electrode 144 correspondingly has the larger length. By expanding (i.e. recessing into the second part 152 of the shielding layer 150) a part of the opening edge of the opening 152cC corresponding to the leftmost slit 144a, an aperture ratio of the pixel unit 140 is increased. It should be noted that in the embodiment of FIG. 8, viewing from the direction perpendicular to the first substrate 110, the third opening edge 152cC-3 and the fourth opening edge 152cC-4 respectively include the first portion P1 parallel to the first signal line GL and the second portion P2 not parallel to the first signal line GL, though the invention is not limited thereto, and in other embodiments, only the third opening edge 152cC-3 (or the fourth opening edge 152cC-4) may include the first portion P1 parallel to the first signal line GL and the second portion P2 not parallel to the first signal line GL, and the fourth opening edge 152cC-4 (or the third opening edge 152cC-3) is parallel to the first signal line GL, which also increase the aperture ratio of the pixel unit 140. Moreover, in the embodiment of FIG. 7, the second portion P2 of the third opening edge 152cC-3 and the second portion P2 of the fourth opening edge 152cC-4 are respectively V-shape fold lines recessed toward an inner of the second portion 152 of the shielding layer 150. However, the invention is not limited thereto, and in other embodiments, the second portion P2 of the third opening edge 152cC-3 and/or the second portion P2 of the fourth opening edge 152cC-4 may be respectively slashes extending toward an inner of the second portion 152 of the shielding layer 150 or fold lines with other shapes, which can also increase the aperture ratio of the pixel unit 140. In overall, the shape of the opening edge having the first portion P1 and the second portion P2 and the shape of the second portion P2 may be determined according to the layout and positions of the pixel electrode 142, the common electrode 144, the first signal line GL, the second signal line DL and the thin-film transistor T in the pixel unit 140, so as to increase the aperture ratio of the pixel unit 140.

Figure 9:
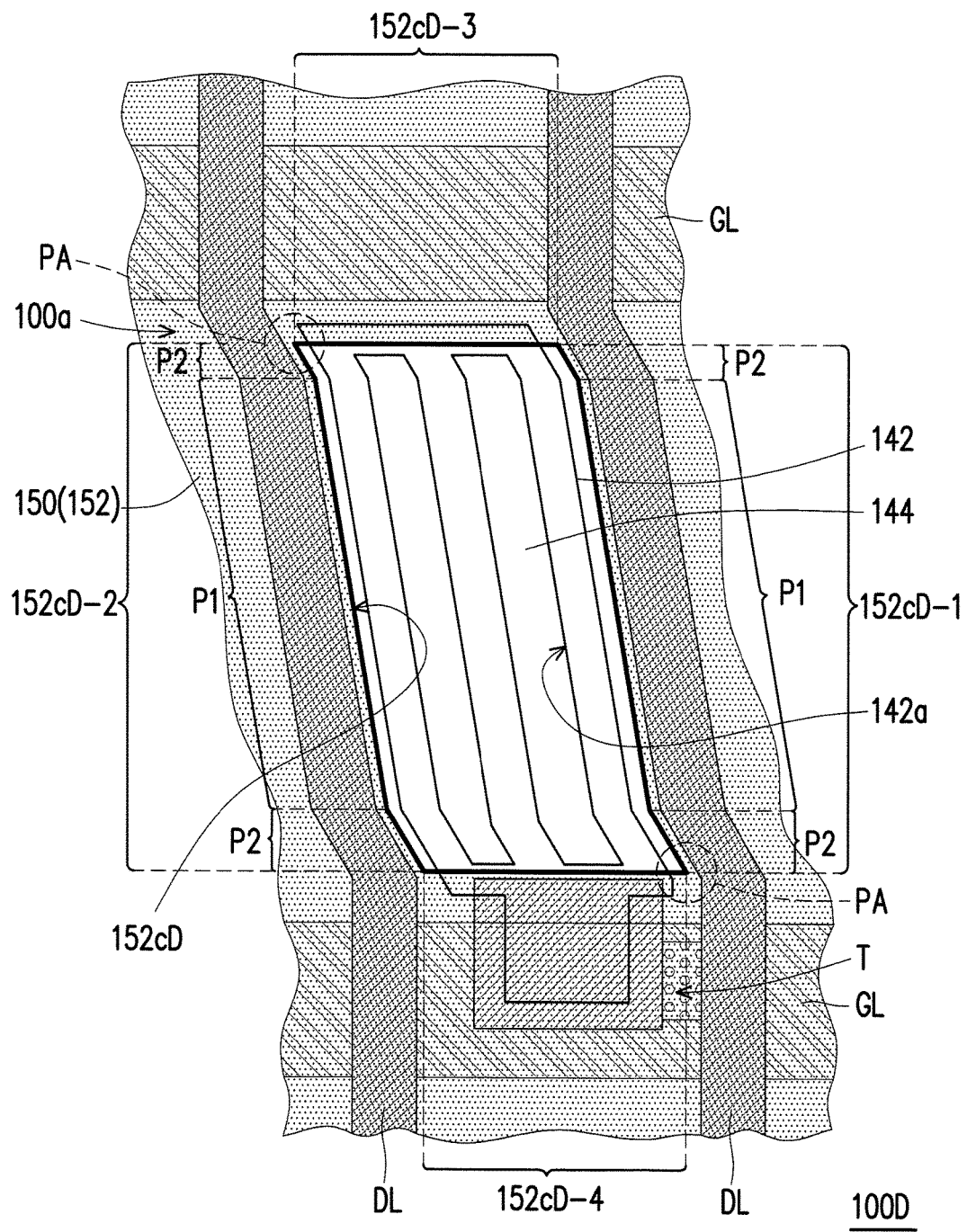
FIG. 9 is a partial top view of a non-rectangular display region of a display panel according to an embodiment of the invention.

FIG. 9 is a partial top view of a non-rectangular display region of a display panel according to an embodiment of the invention. The display panel 100D of FIG. 9 is similar to the aforementioned display panel 100, so that the same or similar components are denoted by the same or similar referential numbers. A main difference between the display panel 100D and the display panel 100 is that a shape of an opening 152cD of the shielding layer 150 of the display panel 100D is different to the shape of the opening 152c of the shielding layer 150 of the display panel 100. The above difference is described in detail below, and the same or similar parts of the two embodiments may refer to related description of the aforementioned embodiment.

Referring to FIG. 9, the second portion 152 of the shielding layer 150 is located on the non-rectangular display region 100a. The second portion 152 of the shielding layer 150 covers at least one of the first signal line GL, the second signal line DL and the thin-film transistor T of each of the pixel units 140. The second portion 152 of the shielding layer 150 has a plurality of openings 152cD. Each of the openings 152cD corresponds to one pixel unit 140. The opening 152cD has a first opening edge 152cD-1, a second opening edge 152cD-2, a third opening edge 152cD-3 and a fourth opening edge 152cD-4. The first opening edge 152cD-1 and the second opening edge 152cD-2 are opposite to each other. The third opening edge 152cD-3 is connected between the first opening edge 152cD-1 and the second opening edge 152cD-2. The fourth opening edge 152cD-4 is opposite to the third opening edge 152cD-3, and is connected between the first opening edge 152cD-1 and the second opening edge 152cD-2.

Particularly, at least one of the first opening edge 152cD-1 and the second opening edge 152cD-2 includes a first portion P1 and a second portion P2 having an extending direction different with that of the first portion P1. Viewing from the direction perpendicular to the first substrate 110, the third opening edge 152cD-3 and the fourth opening edge 152cD-4 may be parallel to the first signal line GL. The first portion P1 of at least one of the first opening edge 152cD-1 and the second opening edge 152cD-2 is parallel to the second signal line DL. In detail, in the present embodiment, the first opening edge 152cD-1 includes one first portion P1 and two second portions P2, wherein the two second portions P2 are located at two sides of the first portion P1. One of the second portions P2 of the first opening edge 152cD-1 is connected between the first portion P1 of the first opening edge 152cD-1 and the third opening edge 152cD-3. The other one of the second portions P2 of the first opening edge 152cD-1 is connected between the first portion P1 of the first opening edge 152cD-1 and the fourth opening edge 152cD-4. The second opening edge 152cD-2 includes one first portion P1 and two second portions P2, wherein the two second portions P2 are located at two sides of the first portion P1. One of the second portions P2 of the second opening edge 152cD-2 is connected between the first portion P1 of the second opening edge 152cD-2 and the third opening edge 152cD-3. The other one of the second portions P2 of the second opening edge 152cD-2 is connected between the first portion P1 of the second opening edge 152cD-2 and the fourth opening edge 152cD-4.

Referring to FIG. 9, the second portion P2 connected between the first portion P1 of the first opening edge 152cD-1 and the third opening edge 152cD-3 and the second portion P2 connected between the first portion P1 of the second opening edge 152cD-2 and the third opening edge 152cD-3 incline towards the same direction and are parallel to each other. The second portion P2 connected between the first portion P1 of the first opening edge 152cD-1 and the fourth opening edge 152cD-4 and the second portion P2 connected between the first portion P1 of the second opening edge 152cD-2 and the fourth opening edge 152cD-4 incline towards the same direction and are parallel to each other. The second portion P2 connected between the first portion P1 of the first opening edge 152cD-1 and the third opening edge 152cD-3 and the second portion P2 connected between the first portion P1 of the first opening edge 152cD-1 and the fourth opening edge 152cD-4 may be parallel to each other. The second portion P2 of the second opening edge 152cD-2 and the third opening edge 152cD-3 are connected to each other so as to form a protruding angle PA, and the second portion P2 of the first opening edge 152cD-1 and the fourth opening edge 152cD-4 are connected to each other so as to form the protruding angle PA, and the protruding angle PA protrudes towards a direction away from a center of the opening 152cD.

In the present embodiment, by forming the protruding angle PA at a corner of the opening 152cD protruding towards the direction away from the center of the opening 152cD, the aperture ratio of the pixel unit 140 is increased. It should be noted that in the embodiment of FIG. 9, the protruding angles PA are respectively formed at an upper left corner and a lower right corner of the opening 152cD, but the invention is not limited thereto, and in other embodiments, the opening 152cD may have only one protruding angle PA, or the opening 152cD may have more than two protruding angles PA. In overall, the number and positions of the protruding angles PA may be determined according to the layout and positions of the pixel electrode 142, the common electrode 144, the first signal line GL, the second signal line DL and the thin-film transistor T in the pixel unit 140, so as to increase the aperture ratio of the pixel unit 140.

In summary, in the display panel of the invention, the first portion of the shielding layer is used to define the non-rectangular display region. Particularly, the inner contour of the first portion of the shielding layer is parallel to the first signal line and the second signal line of the pixel unit, and the inner contour of the first portion of the shielding layer substantially presents a serrated edge with a tiny tooth pitch. In this way, regardless of the shape of the non-rectangular display region to be realized, by using the aforementioned design principle, any free-form non-rectangular display region can be easily and quickly designed, so as to realize the display panel with the non-rectangular display region.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel, having a non-rectangular display region and a peripheral region outside the non-rectangular display region, the display panel comprising:
   a first substrate;
   a plurality of pixel units, disposed on the first substrate, and located on the non-rectangular display region, and each of the pixel units comprising:
      a thin-film transistor,
      a first signal line and a second signal line, electrically connected to the thin-film transistor, wherein an extending direction of the first signal line is different with an extending direction of the second signal line; and
   a shielding layer, comprising:
      a first portion, located on the peripheral region; and
      a second portion, located on the non-rectangular display region, wherein an inner contour of an orthogonal projection of the first portion of the shielding layer on the first substrate comprises a plurality of first line segments and a plurality of second line segments, the first line segments are respectively parallel to orthogonal projections of the corresponding first signal lines on the first substrate, and the second line segments are respectively parallel to orthogonal projections of the corresponding second signal lines on the first substrate.

2. The display panel as claimed in claim 1, further comprising:
   a second substrate, disposed opposite to the first substrate, wherein the shielding layer is disposed on the second substrate.

3. The display panel as claimed in claim 1, wherein one of the first signal line and the second signal line is a gate line, and the other one of the first signal line and the second signal line is a data line.

4. The display panel as claimed in claim 1, wherein an included angle between an orthogonal projection of the first signal line on the first substrate and an orthogonal projection of the second signal line on the first substrate is $\theta$, and $\theta=90°$.

5. The display panel as claimed in claim 1, wherein an included angle between an orthogonal projection of the first signal line on the first substrate and an orthogonal projection of the second signal line on the first substrate is $\theta$, and $75°\leq\theta\leq105°$, $\theta\neq90°$.

6. The display panel as claimed in claim 5, wherein the pixel units are arranged into a plurality of pixel rows and a plurality of pixel columns, and an included angle between two orthogonal projections of the first signal line and the second signal line of one pixel unit on the first substrate is $(90°-\alpha)$, and an included angle between two orthogonal projections of a first signal line and a second signal line of another pixel unit on the first substrate is $(90°+\alpha)$, the another pixel unit adjacent to the pixel unit is located in a same pixel column with the pixel unit, and $0°<\alpha\leq15°$.

7. The display panel as claimed in claim 6, wherein $\alpha=7°$.

8. The display panel as claimed in claim 6, wherein two of the second line segments are respectively parallel to orthogonal projections of two second signal lines of two pixel units on the first substrate, and the two pixel units are located in a same pixel column and located adjacent to each other.

9. The display panel as claimed in claim 5, wherein the second signal line of each of the pixel units comprises a first portion and a second portion extending towards different directions, an included angle between an orthogonal projection of the first portion of the second signal line on the first substrate and an orthogonal projection of the second portion of the second signal line on the first substrate is $(180°-2\beta)$ or $(180°+2\beta)$, and $0°<\beta\leq15°$.

10. The display panel as claimed in claim 9, wherein the pixel units are arranged into a plurality of pixel rows and a plurality of pixel columns, an included angle of one pixel unit is $(180°-2\beta)$, an include angle of another pixel unit located in a same pixel column with the pixel unit and located adjacent to the pixel unit is $(180°+2\beta)$.

11. The display panel as claimed in claim 9, wherein one of the second line segments is parallel to orthogonal projections of the first portion of the second signal line and the second portion of the second signal line on the first substrate.

12. The display panel as claimed in claim 1, wherein the second portion of the shielding layer has a plurality of openings respectively corresponding to the plurality of pixel units.

13. The display panel as claimed in claim 12, wherein orthogonal projections of edges of one of the openings on the first substrate are parallel to orthogonal projections of a first signal line and a second signal line of a corresponding pixel unit on the first substrate.

14. The display panel as claimed in claim 12, wherein one of the openings has a first opening edge, a second opening edge, a third opening edge and a fourth opening edge, the first opening edge and the second opening edge are disposed opposite to each other, the third opening edge and the fourth opening edge are disposed opposite to each other, the third opening edge is connected between the first opening edge and the second opening edge, the fourth opening edge is connected between the first opening edge and the second opening edge, at least one of the third opening edge and the fourth opening edge comprises a first portion and a second portion, an extending direction of the first portion of the at least one of the third opening edge and the fourth opening edge and an extending direction of the second portion of the at least one of the third opening edge and the fourth opening edge are different with each other, and an orthogonal projection of the first portion of the at least one of the third opening edge and the fourth opening edge on the first substrate is parallel to an orthogonal projection of a corresponding first signal line on the first substrate.

15. The display panel as claimed in claim 12, wherein one of the openings comprises a first opening edge, a second opening edge, a third opening edge and a fourth opening edge, the first opening edge is opposite to the second opening edge, the third opening edge is opposite to the fourth opening edge, the third opening edge is connected between the first opening edge and the second opening edge, the fourth opening edge is connected between the first opening edge and the second opening edge, at least one of the first opening edge and the second opening edge comprises a first portion and a second portion, an extending direction of the first portion of the at least one of the first opening edge and the second opening edge and an extending direction of the second portion of the at least one of the first opening edge and the second opening edge are different with each other, an orthogonal projection of the first portion of the at least one of the first opening edge and the second opening edge on the first substrate is parallel to an orthogonal projection of the second signal line on the first substrate, the second portion of the at least one of the first opening edge and the second opening edge and one of the third opening edge and the fourth opening edge are connected to form a protruding angle, and the protruding angle protrudes towards a direction away from a center of the opening.

16. The display panel as claimed in claim 1, wherein the second portion of the shielding layer covers at least one of the first signal line, the second signal line and the thin-film transistor of each of the pixel units.

17. A display panel, having a non-rectangular display region and a peripheral region outside the non-rectangular display region, the display panel comprising:
   a first substrate;
   a plurality of pixel units, disposed on the first substrate, and located on the non-rectangular display region, and each of the pixel units comprising:
      a thin-film transistor,
      a first signal line and a second signal line, electrically connected to the thin-film transistor, wherein an extending direction of the first signal line is different with an extending direction of the second signal line; and
   a shielding layer, located on the peripheral region,
wherein an inner contour of an orthogonal projection of the shielding layer on the first substrate comprises a plurality of first line segments and a plurality of second line segments, the first line segments are respectively parallel to orthogonal projections of the corresponding first signal lines on the first substrate, and the second line segments are respectively parallel to orthogonal projections of the corresponding second signal lines on the first substrate.

18. The display panel as claimed in claim 17, wherein an included angle between an orthogonal projection of the first signal line on the first substrate and an orthogonal projection of the second signal line on the first substrate is θ, and θ=90°.

19. The display panel as claimed in claim 17, wherein an included angle between an orthogonal projection of the first signal line on the first substrate and an orthogonal projection of the second signal line on the first substrate is θ, and 75°≤θ≤105°, θ≠90°.

20. A display panel, having a non-rectangular display region and a peripheral region outside the non-rectangular display region, the display panel comprising:
   a first substrate;
   a plurality of pixel units, disposed on the first substrate, and located on the non-rectangular display region, and each of the pixel units comprising:
      a thin-film transistor,
      a first signal line and a second signal line, electrically connected to the thin-film transistor, wherein an extending direction of the first signal line is different with an extending direction of the second signal line; and
   a shielding layer,
wherein a part of a contour of an orthogonal projection of the shielding layer on the first substrate extends along outer edges of the pixel units located at the edge of the non-rectangular display region, and comprises a plurality of first line segments and a plurality of second line segments, the first line segments are respectively parallel to orthogonal projections of the corresponding first signal lines on the first substrate, and the second line segments are respectively parallel to orthogonal projections of the corresponding second signal lines on the first substrate.

\* \* \* \* \*